Oct. 13, 1925.

M. C. INDAHL 1,556,691

PUNCH CUTTING MACHINE

Filed Feb. 15, 1923      7 Sheets-Sheet 5

FIG. 8.

INVENTOR:
Mauritz C. Indahl,
BY John A. Ferguson
HIS ATTORNEY

Oct. 13, 1925.

M. C. INDAHL

PUNCH CUTTING MACHINE

Filed Feb. 15, 1923

INVENTOR:
Mauritz C. Indahl,
BY John A. Ferguson
HIS ATTORNEY.

Patented Oct. 13, 1925.

1,556,691

UNITED STATES PATENT OFFICE.

MAURITZ C. INDAHL, OF PHILADELPHIA, PENNSYLVANIA, ASSIGNOR TO LANSTON MONOTYPE MACHINE COMPANY, OF PHILADELPHIA, PENNSYLVANIA, A CORPORATION OF VIRGINIA.

PUNCH-CUTTING MACHINE.

Application filed February 15, 1923. Serial No. 619,219.

*To all whom it may concern:*

Be it known that I, MAURITZ C. INDAHL, a citizen of the United States, and a resident of Philadelphia, county of Philadelphia, State of Pennsylvania, have invented certain new and useful Improvements in Punch-Cutting Machines; and I do hereby declare the following to be a full, clear, and exact description of the same, reference being had to the accompanying drawings, forming part of this specification, and to the characters of reference marked thereon.

This invention relates to machines for reproducing pattern designs in cameo or in intaglio. More particularly it relates to machines of this kind in which a pattern is reproduced by a power driven cutting tool operating upon a piece of steel or other metal for the purpose of producing a punch which can later be used in the producion of matrices such as those used in the art of type casting.

Machines of this character have been produced in which there are adjustments whereby the pattern may be altered in its reproduction either horizontally as to the width or vertically as to the height of the pattern reproduced, or both vertically and horizontally. Such machines may be termed vertical pantograph machines in contradistinction to the ordinary flat pantograph, and are represented, for example, by United States Letters Patent 938,074, dated October 26, 1909.

The main object of the present invention is to produce a pattern design reproducing machine in which the height and width adjustments may be made independently of each other without affecting or influencing each other; a machine in which the pivotal plane of the pantograph or tracer arm is not altered whatever the adjustment, and the length of the tracer arm is not affected by the adjustment: and a machine in which these adjustments produce a variation as desired in height and in width without distortion, such as may occur in a diagonal direction, as in the case of the patented machine when both the height and the width adjustments are influencing the action of the cutter of the machine and the length of the tracer arm when the tracer is operated in the width direction is not the same as its length when operated in the height direction. Another object is the combination of a vertical pantograph with a horizontal or flat pantograph, or the like, by which a variety of proportional reproductions may be had or different size patterns may be employed and by which the tracer may follow the pattern accurately and without producing distortion: another object is to adapt a pantograph machine to definite independent adjustments which can be made by an operator not specially trained or skilled and to produce control mechanisms for the machine which are certain and definite in action and are capable of being handled by an unskilled operator. Other objects will be pointed out hereinafter or will otherwise appear in connection with the following description of the particular embodiment of the invention which is shown in the accompanying drawings in which, Fig. 1 is a plan view of a punch cutting machine embodying the invention, Fig. 2 is a side elevation thereof, Fig. 3 is a sectional detail showing the latch mechanism for the work or punch blank holder.

Fig. 4 is a perspective, partly in section, showing the quill retaining and elevating device.

The machine illustrated is a vertical pantograph machine of the general type disclosed in Patent 938,074, previously mentioned. The frame of the machine comprises a base 1 provided with hollow standards 2 connected at the top by a cross piece 3, which cross piece is provided with bearings for the tool holder. Located above the cross piece are upright frame members 4, provided at their top with a horizontal ring member 5 in which is supported the universal joint, which is, as shown, in the form of gimbal rings. The members 4 support intermediate the cross piece 3 and the gimbal rings, a group of sliding plates associated with the devices for holding the work to be operated upon, which in this machine is usually a steel punch blank. The ring member 5 of the frame is provided with pivots 6 extending horizontally and being in alignment. On the pivots 6 is supported the gimbal ring 7 inside of the frame ring 5. The ring 7 is provided with horizontal aligned pivots 8, the pivots 8 being at right angles to the pivots 6 and supporting within the outer gimbal ring 7 an intermediate gimbal ring 9. This intermediate ring is provided with radial extensions 10, the ends of which project beyond the frame ring 5 and have secured to them the converging rods 11 which meet in a tracer holder 12; the extensions 10, rods 11 and holder 12 constituting the tracer arm of the machine and ending in the tracer 13 itself (Fig. 2) located just above the base 1 so as to swing thereover between the frame uprights 2.

Figure 1:
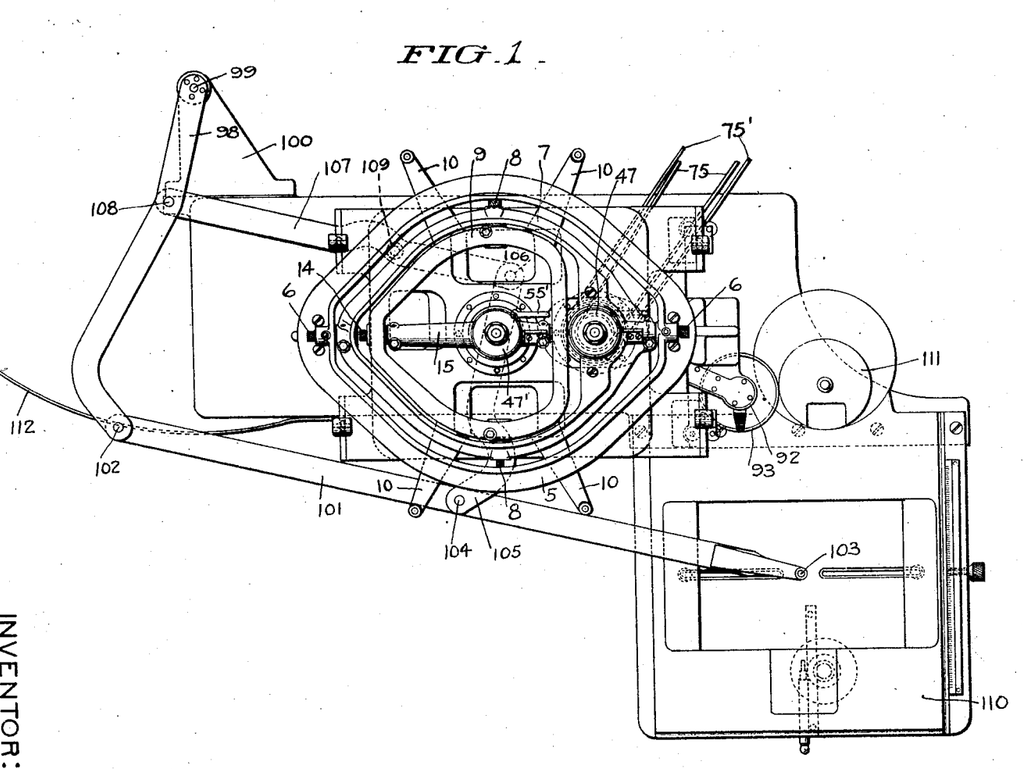
Figures 2, 3, 4:
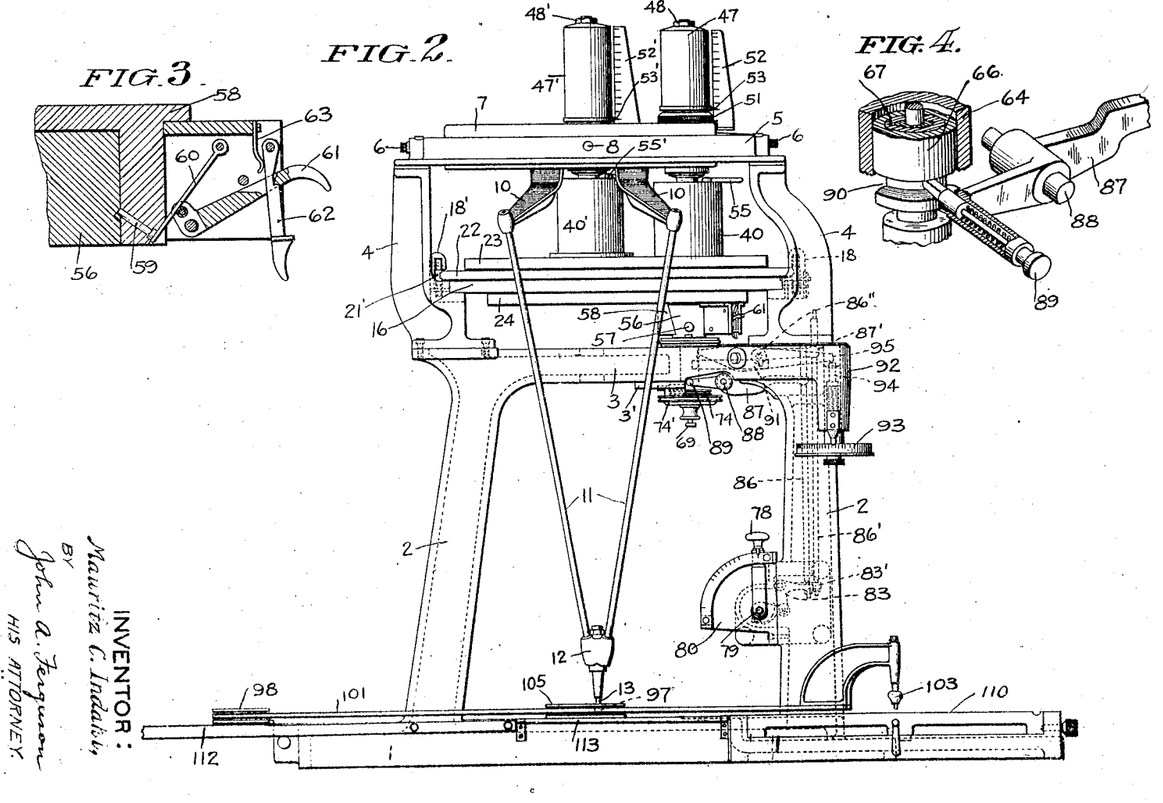

The intermediate gimbal ring 9 is provided with pivots 14 in alignment with the previously mentioned pivots 6 and extending inwardly in the ring 9 to support the inner gimbal ring which, as shown, is in the form of a cross bar 15. All the pivots of the gimbal joint are permanently in the same horizontal plane when the tracer 13, as shown in Figs. 1 and 2, is at its central point immediately below the bell 47', and are non-adjustable out of this plane.

Figure 5:
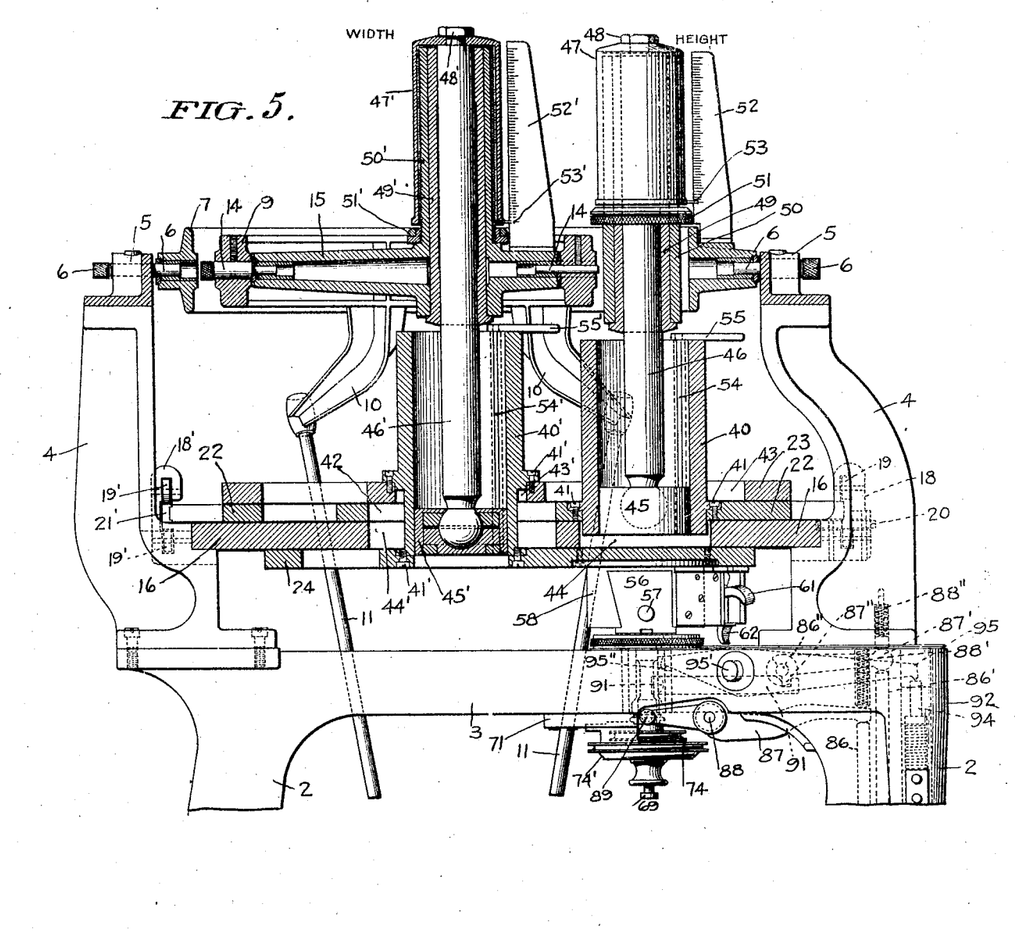
Fig. 5 is an enlarged view of the top portion of the machine shown partly in elevation and partly in vertical section.
Figure 8:
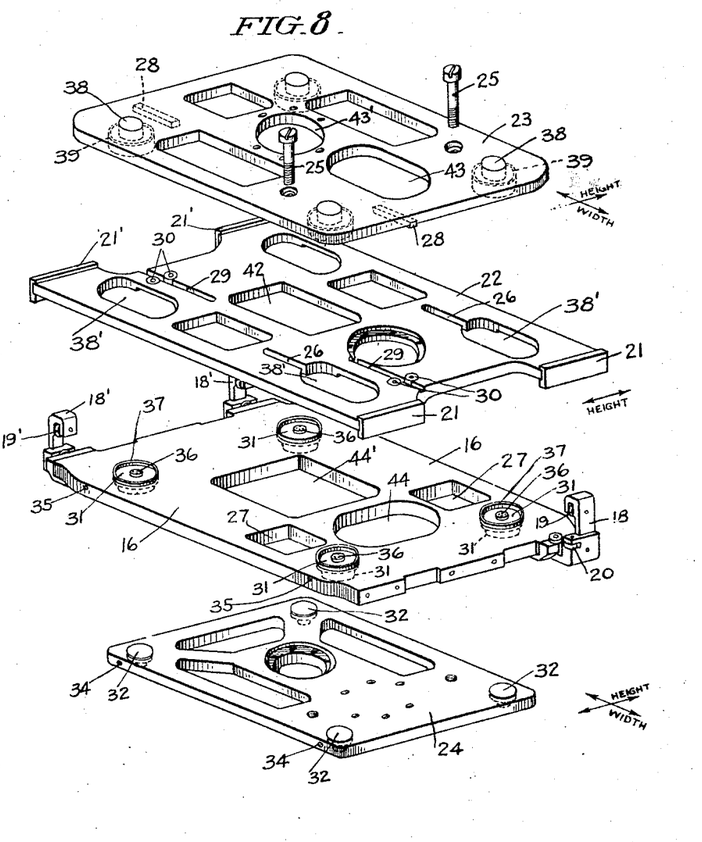
Fig. 8 is a perspective view in separated relation of the sliding members or plates by which the movements of the tracer arm are communicated to the work.
Figure 9:
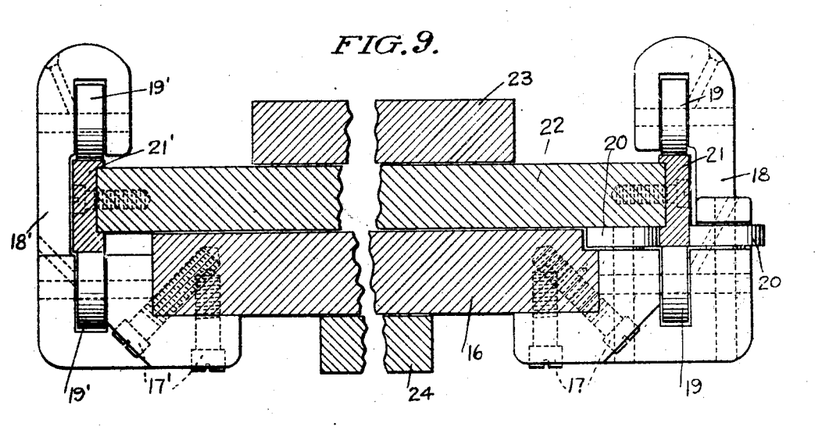
Fig. 9 is a vertical section through a portion of the plates, illustrating particularly the roller bearings for one of the plates.

The outer gimbal ring 7 and the inner gimbal member 15 are provided with connections between them and the sliding plate mechanism associated with the blank to be operated upon by the tool. These connections are adjustable and one connection is provided for adjustable control of movement of the work in one direction, and the other is independently adjustable to control the movement of the work in a direction at right angles to the first mentioned direction. The sliding plates are four in number, as shown in Fig. 8, of which the third from the top is fixed to the frame extensions 4. This plate 16 is seated in recessed shoulders on the extensions 4, as shown in Figs. 2 and 5, and has secured to it by screws 17 (Fig. 9) the brackets 18 on one side of the plate holding vertical rollers 19 and horizontal rollers 20, these rollers being adapted to guide and give smooth bearing to the rim pieces 21 secured to the second plate from the top identified by the character 22. The other side of the plate 16 is provided with brackets 18' secured by screws 17' and having vertical rollers 19' to co-operate with the rim pieces 21'. In this manner the plate 22 is guided in its movements in a direction measuring the height of the character reproduced and is also held by the vertical roller bearings from movement vertically. The plate 22 can therefore move only in one direction as indicated by the arrow in Fig. 8.

The top plate 23 is secured to the bottom plate 24 by screws 25 (Fig. 8) which extend through the slotted holes 26 in the plate 22, and through the square holes 27 in the fixed plate 16. The top and bottom plates being bound together, move as a unit. They move at right angles to the direction of plate 22, namely, in a width direction and they can also partake of the movement of plate 22. Plates 23 and 24 therefore are capable of movement in both the height and width directions as indicated by the arrows in Fig. 8. Keys 28 running in a width direction are secured to the lower face of top plate 23 and run in grooves 29 in plate 22, being guided by rollers 30 in said plate 22. These keys allow movement of the top and bottom plates in the width direction and cause the top and bottom plates to move in a height direction with plate 22.

Figure 10:
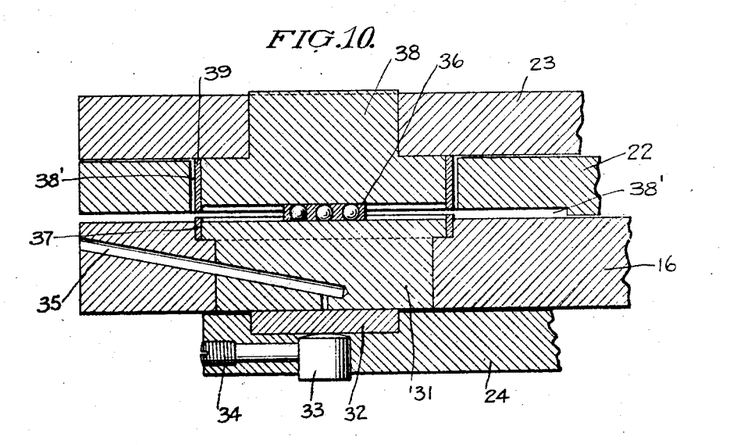
Fig. 10 is a vertical section through a portion of the plates, showing a ball bearing and other associated parts.

The fixed plate 16 is provided with bearing blocks 31 (Fig. 10) adjusted in an obvious way by the plates 32, the pins 33, the set screws 34; and conduits 35 leading through the plate 16, and the blocks 31 serve to admit lubricant to the bearing surfaces between fixed plate 16 and bottom plate 24. On the top of each block 31 is a roller bearing 36 which floats upon the block 31 within the limits of the raised rim 37. The plate 23 is provided with bearing blocks 38 to co-operate with the ball bearings 36 and having a rim 39 to prevent the ball bearings 36 from becoming displaced. The blocks 38 project through apertures 38' in plate 22. There are four of these ball bearing assemblies, as shown in Fig. 8, one near each corner of the plate 16. The weight of the top plate 23 and the bottom plate 24 is thus carried through the ball bearings 36 by the fixed plate 16, whereas as explained before, the weight of the intermediate plate 22 is carried on the roller bearings 19 and 19'.

The connections previously referred to between the outer gimbal ring 7 and the inner gimbal ring 15 and these plates consist in slidable, adjustable connections comprising in each case a cylinder and piston, the latter being movable vertically to change the work arm or the distance between the pivotal plane of the gimbal joint and the work, which is carried upon the bottom plate 24.

The height adjustment comprises the cylindrical member 40 (Fig. 5) secured by screws 41 to the plate 22 and extending upwardly therefrom through an aperture 43 in the top plate 23, the lower part thereof extending into the aperture 44 in the fixed plate 16. Within the cylindrical member 40 is a piston 45 connected by a ball and socket joint with a piston rod 46, to the upper end of which is secured the bell piece 47 by the nut 48. Surrounding the upper part of the piston rod 46 is a bearing sleeve 49 set within the boss 50 which forms a part of, and projects upwardly from, the outer gimbal ring 7 at one side thereof and in line with the pivots 6. On this boss 50 are screw threads for co-operating with the nut 51. If the bell 47 is lifted by hand or by manually screwing up the nut 51, it will cause the piston rod 46 and the piston 45 to lift within the cylinder 40 and in this way an adjustable length between the gimbal ring 7 and the operating point 45 of the plate 22 may be produced. The work arm, being the distance between the plane of the pivots of the universal joint and the center of the ball joint of piston 45, may thus be changed in length.

Alongside of the bell 47 is the scale 52 and the pointer 53 is provided on the bell so that an adjustment may be made according to a definite measurement. When the adjustment has been produced, the cam rod 54 extending vertically through the wall of the cylinder 40 and having a cam portion adapted to project through said wall against the piston 45 is turned by operating the handle 55 slightly. After the locking has been produced by manipulating the handle 55, the adjusting nut 51 may be backed off to allow unhindered movement of the plates and tracer arm. This locking device is of the same construction as that shown in Letters Patent No. 938,074, previously referred to.

The width connection between the inner gimbal ring 15 and the plates is, as shown, at the center of the gimbal rings and comprises a cylinder 40' secured by screws 41' to the top plate 23 and bottom plate 24. This cylinder 40' extends upwardly through aperture 43' in plate 23, aperture 42 in plate 22 and aperture 44' in plate 16. Its piston 45' is secured by a universal joint to the piston rod 46' upon which a bell 47' is secured by a nut 48' and around which is a bearing sleeve 49' and a boss 50' forming part of the gimbal bar 15; the boss 50' is threaded to co-operate with a nut 51' and a scale 52' and pointer 53' are provided, as in the case of the height adjustment. The lock for the piston is similar to that previously described, and consists of a cam member 54' with its handle 55'.

The blank to be operated upon is carried in the holder 56 (Figs. 2, 3 and 5) having a handle 57. This holder 56 slides horizontally in a member 58 secured to the bottom of the lower plate 24 by screws and provided with a dove tail in which the holder fits; and the latter is provided with a small notch, in its side, as in the patented construction referred to, into which the pin 59 (Fig. 3) projects under the influence of leaf spring 60, the latter being controlled by the cam lever 61, held by the finger latch 62 and leaf spring 63 in a manner which will be readily understood by an inspection of Fig. 3. When the finger latch 62 is thrown against the resistance of the leaf spring 63, the cam lever 61 is free to drop and thus relieve pressure of the leaf spring 60 upon the pin 59; the latter drops out of the notch in the holder 56 and the holder may be removed by the use of the handle 57. When it is desired to replace the tool holder, it is pushed into position in the member 58 and the cam lever 61 is moved to cause the pin 59 to enter the notch in the holder and secure it in position.

Immediately below the tool holder 56, the frame cross piece 3 is provided with an aperture in which is secured the sleeve 64 (Figs. 4, 6 and 7) in which the tool holding device or quill may be inserted in an upward direction, the tool 65 being on the upper end of the quill and being retained in its holder in a manner well known to those skilled in the art.

The quill consists of the stationary sleeve 66 which fits within the frame sleeve 64 and within which is the inner rotatable sleeve 67 running on roller bearings between the sleeves 66 and 67. The tool 65 is carried by a tool holder 68 extending vertically and centrally through the quill and ending at the bottom in a handle 69, the tool being yieldably held in position on the sleeve 67 by the spring 70 coiled around the stem 68 within the sleeve 67. The handle portion 69 may be unscrewed from the upper portion so that the latter may be removed and the tool replaced in a well-known manner.

Figure 6:
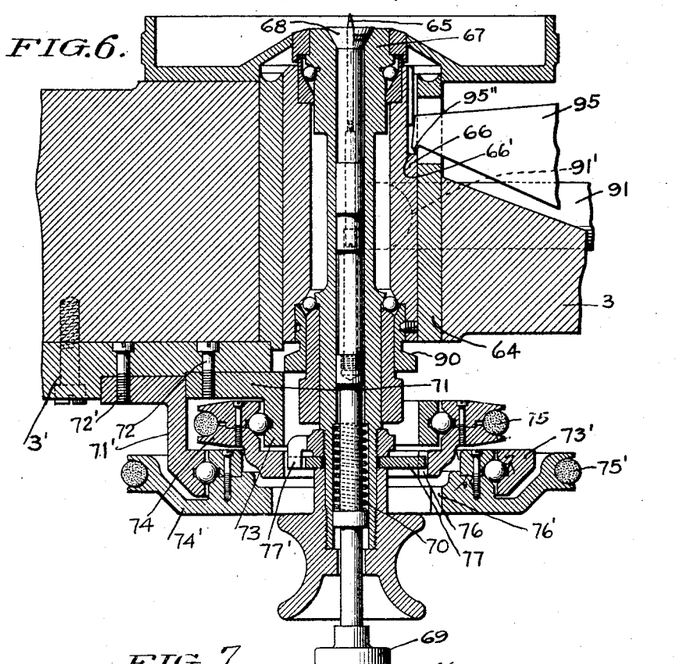
Fig. 6 is a vertical section through the quill holding the cutting tool and associated parts.
Figure 7:
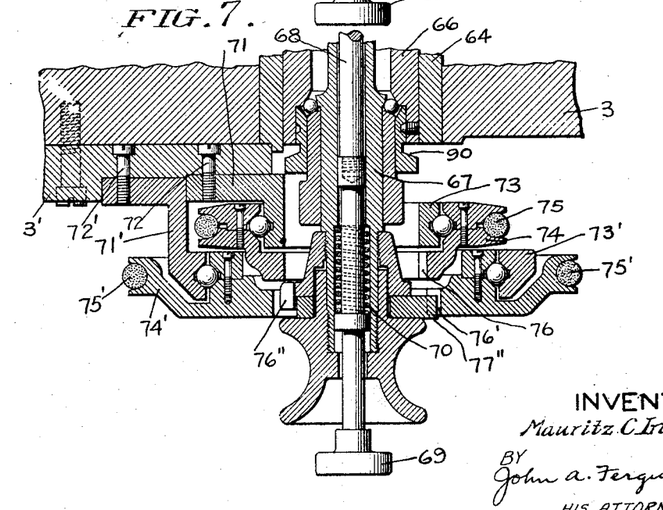
Fig. 7 is a section similar to that of the lower part of Fig. 6 with the pulley clutch in a different position from that of Fig. 6.

Extending below and secured to the frame cross piece 3 is the plate 3' to which is secured by screws 72, a bracket 71 forming the inner pulley member 73 around which runs upon ball bearings the outer pulley member 74 provided with a groove in its periphery for the driving belt 75. The pulley 74 is provided with a central aperture coaxial with the quill and this aperture is provided with a radial slot 76 into which a lug on the quill clutch member 77 projects, the latter being provided with a slot into which projects the hook 77' the latter being threaded to the rotating quill member 67 (Fig. 6). The quill when inserted thus clutches through its members 77 and 77' to the outer pulley member 74 and the quill is therefore driven by the belt 75 at a definite speed.

If it is desired to drive the quill at a slower speed, as for example, the quill containing the roughing tool, it is provided with a hook 76″ and a clutch member 77″ (Fig. 7) which co-operates with a slot 76′ in the inner member 74′ of the larger pulley, driven by belt 75′, the outer member 73′ of this pulley being supported by a bracket 71′ secured by screws 72′ to the plate 3′ and having a ball race for ball bearings between the inner member 74′ and the outer member 73′. Since the pulley 74′ is larger in diameter than the pulley 74, the speed of rotation is less in the case of pulley 74′. The belts 75 and 75′ are adapted to pass off to a suitable driving mechanism, preferably comprising an electric motor (not shown).

Figure 11:
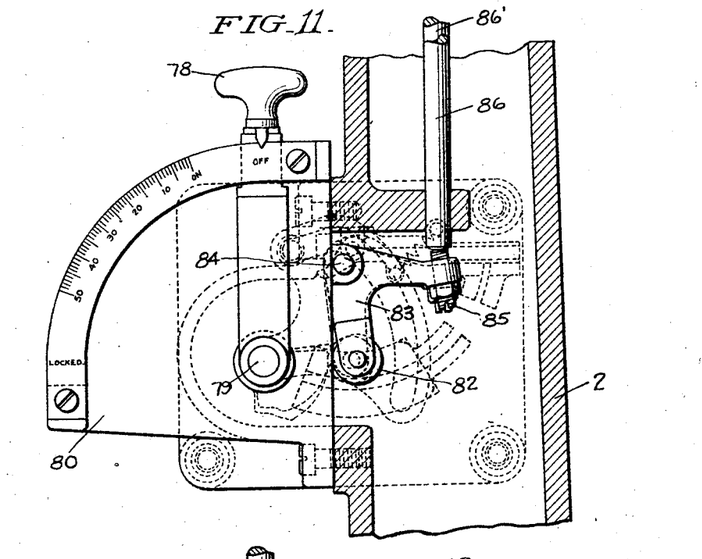
Fig. 11 is a view partly in section of the control lever mechanism.
Figure 12:
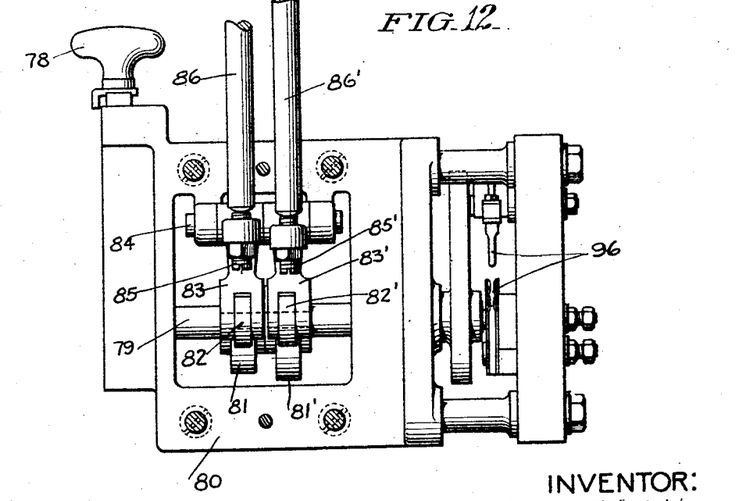
Fig. 12 is a side elevation thereof.

The control of the machine is largely located at a single point so that the operator may have as few mechanisms as possible to handle. The control device, shown in Figs. 11 and 12, consists of a handle lever 78 secured to shaft 79 in the frame 80, the latter being secured to one of the standards 2 of the machine. The shaft 79 is provided with a cam 81 operating on a roller 82 secured to one arm of bell crank lever 83, pivoted on the shaft 84 and provided at its other end with an adjustable bearing in the form of a screw 85 to contact with the vertical rod 86 extending upwardly within the hollow frame member 2. The upper end of the rod 86 bears against the outer end of the quill elevating lever 87 pivoted at 88 (Figs. 4 and 5) in the cross member 3 of the frame and pressed downwardly at its outer end by a spring 88′; the lever 87 is provided at its inner end with a spring catch 89, the end of which extends radially toward the center of the quill below the frame member 3 and fits into the annular notch 90, shown particularly in Figs. 4, 6 and 7. The operator may pull the catch 89 outwardly and the quill will be removable in a downward direction, while pushing the quill upwardly within the sleeve 64 will cause the spring catch 89 to seat itself within the notch 90. When the handle 78 is turned so that the cam 79 allows the rod 86 to move downwardly under influence of the spring 88′, the lever 87 moves to elevate the catch 89 and thus push the quill upwardly as far as the adjustable stop, to be described, will allow such movement.

The cam shaft 79 is provided also with cam 81′, which operates on roller 82′ of bell crank lever 83′, pivoted on shaft 84, the outer end of the work arm of said bell crank lever being provided with an adjustable screw 85′ for contact with rod 86′ extending vertically within the hollow standard 2 of the frame alongside of rod 86. The upper end of rod 86′ contacts with the outer end of lever 87′ pivoted at 86″ and normally pressed downwardly against the rod by a spring 88″ (Fig. 5). This lever 87′ is provided with a short arm 87″ working in a notch in a slidable locking member 91 which moves under the influence of the spring pressed lever 87′, in a radial direction with respect to the quill, and has a concave end 91′, shown in dotted lines in Fig. 6, which is pressed against quill member 66 to lock it frictionally in place. This action occurs by proper timing of the cams 81 and 81′ after the quill has been elevated against the adjustable stop now to be described.

An extension 92 of the frame is provided at the upper end of the right hand standard 2, in which the rods 86 and 86′ are located, within which extension is a micrometer screw device 93 terminating in an indicator hand wheel located in a position to be easily reached by the operator. The upper end of the micrometer terminates in a shaft extension 94 (Fig. 5) adapted to contact with lever 95, pivoted at 95′ and provided at its inner end with a gage point 95″ (Fig. 6) extending through an aperture in the sleeve 64 and adapted to contact with a shoulder 66′ formed on the quill member 66 by flattening a portion of the periphery thereof. When the micrometer device 93 is operated, it causes the lever 95 to take a position in which its gage point 95″ forms a stop to limit the movement of the quill in an upward direction under the influence of the elevating lever 87. In other words, the control of the micrometer 93 determines the height of the tool 65 with reference to the frame of the machine, and therefore the depth to which it will cut into the punch blank, the latter being held directly above the tool by the blank holder 56.

The lever 78 also operates through the shaft 79 an electric contact device 96 (Fig. 12) so that when the handle is moved from the vertical position shown in Fig. 2, toward its horizontal position, it first closes the switch points 96 and causes the electric motor to which the belts 75 and 75′ are connected to operate; then as it is swung farther down, it first causes rod 86, lever 87 and catch device 89, operating in connection with notch 90 of the quill to move the latter upwardly until stopped by the gage point 95″ of lever 95, the setting of which has been determined by operation of the micrometer device 93. When the quill has risen to its proper height to determine the depth of cut, cam 81′ operates upon rod 86′ to cause lever 87 and friction block member 91 to operate to hold the quill firmly in its adjusted position.

The base plate 1 of the machine may be used in connection with tracer 13. As shown, however, this tracer is connected by a ball joint 97 with a flat pantograph comprising a lever 98 (Fig. 1) pivoted at 99 to a bracket 100 secured to the base plate 1. A lever 101 is secured at the outer end 102 of lever 98 and is provided with a tracer 103 at its opposite end, said lever 101 being secured intermediate its ends at the pivotal point 104 to lever 105 pivoted at 106 to lever 107, pivoted to lever 98 at the point 108, intermediate the ends of lever 98. The tracer joint 97 is in the member 105 and lies in a straight line drawn between the pivotal point 99 for the pantograph, and the tracer point 103 thereof. At a point 109 an aperture is made in the arm 107 and in the base plate so that the pantograph may be pivoted to the base plate 1 by moving the pivot 99 to the point 109. This point 109 is also in the straight line, connecting the pivot 99 with the tracer 103.

The pantograph may thus be pivoted either at the point 99 or at the point 109 so that different proportional reductions may be transmitted to the vertical pantograph: the reduction as shown may be 2 to 1 or 4 to 1. The tracer 103 operates over a table 110 formed as an extension in front of and at the right side of base plate 1. This table is provided with the usual locking and centering devices for the pattern to be reproduced and with a form of the well-known ring magazine 111. The tracer 103, due to the combination of the vertical and flat pantographs, is always vertical and at no time swings over to an angle as in the merely vertical type of machines; thus its following of the pattern is absolutely accurate. The arms 101 and 98 are slidably supported on the bracket 112 and the roller 113 secured to the front edge of the base plate 1 also supports the pantograph by contact with the arm 105.

In the operation of the machine the micrometer 93 is adjusted and the quill containing the tool inserted into the sleeve 64, as previously described. The control lever 78 is then moved from its vertical position to a horizontal position thus accomplishing, as previously stated, the elevation of the tool to the point determined by the stop 95″ set by the micrometer 93, together with the locking of the quill by the locking bar 91 and the rotation of the tool by the belts 75 or 75′; the belt which drives the tool depends upon whether the quill is provided with a clutching device for the smaller pulley driven by belt 75 or for the larger pulley driven by belt 75′. The clutch members are attached to the quills so that the operator need not pay any attention to the speed of rotation of the tool desired: the proper speed is obtained automatically. The work in the form of a steel punch blank, for example, has previously been set, it will be assumed, in the holder 56 and moved into place in the member 58 in which it is held by the pin 59, as previously described.

The operator now moves the tracer 103 in a horizontal plane over the base projection 110 following the outlines of a pattern attached to this base projection in any suitable and well-known manner. It may be considered that there is a pattern of a typographic character on the base 110. Movements in a direction perpendicular to the plane of the drawing in Fig. 2, corresponding with the height of the character, are transmitted in an obvious manner to the tracer arm 11 causing the intermediate gimbal ring 9 to produce through its pivots 8 a tilting movement of the outer gimbal ring 7 upon its pivots 6 secured in the ring member 5 of the frame of the machine. This tilting of the gimbal ring 7 obviously causes the piston 45 to move the cylinder 40 and with it the plate 22 in a height direction. The connection between the gimbal ring 7 and the plate 22 is therefore the height connection and is so indicated in Fig. 5. The plate 22 is driven in the same direction as the tracer 103 but at a reduced distance according to the adjustment of the connection referred to, and this plate through the keys 28 drives the top plate 23 and the bottom plate 24; to the latter is attached the member 58 and the work holder 56. Therefore the work is moved being cut by the tool while moving and the distance it moves is proportional to the distance moved by the tracer arm 103, according to the adjustment, and the direction of movement corresponds with the direction of movement of tracer 103. When the top and bottom plates move with the plate 22, the cylinder 40′ and piston 45′ also move, causing the piston rod 46′ and the inner gimbal ring 15 to tilt upon the pivots 14 in the intermediate gimbal ring 9.

It will be observed that the height driving of the work is accomplished through the height connection with plate 22, and that the width connection merely follows along due to the pivotal connection of the inner gimbal ring 15 with the intermediate gimbal ring 9. It will also be observed that the universal joint for producing height movements consists of the intermediate gimbal ring 9 and the outer ring 7.

When the operator moves the tracer 103 from left to right (Fig. 2) or in a width direction, this motion is transmitted to the intermediate gimbal ring 9 which turns upon the pivots 8 connected the ring 9 with the outer ring 7 and tilts the inner ring 15 through the intermediary of the pivots 14, thus driving the piston 45′ and the cylinder 46′ in a width direction, the amount of movement being proportional to the amount of movement of the tracer 103 according to the adjustment of the connection between the inner gimbal ring 15 and the top and bottom plates to which the cylinder 40' is attached. This connection may be therefore termed the width connection, as indicated in Fig. 5. When the piston 45' drives the plates 23 and 24 and with them the work, the plate 22 is not moved because the keys 28 between the plates 22 and 23 slide in the slots 29 in contact with the rollers 30 (Fig. 8).

It will be noted that the width movement is transmitted through the width connection without affecting in any way the height connection, and it has already been stated that the height connection for driving the plates and the work in the height direction is not influenced in any way by the width adjustment. It is therefore possible to elevate more or less the piston 45 in the height connection without altering the driving of the piston 45' in the width direction. The opposite is also true, namely, that the adjustment of the width connection has no influence upon the driving of the height connection; although it is obvious that if the operator moves the tracer 103 in a diagonal direction, he will operate through both connections at the same time, in which case, however, neither connection influences the other. In moving in the width direction, the universal joint comprises the intermediate gimbal ring 9 and the inner gimbal ring 15. It is apparent therefore that the three-ring construction of the gimbal joint may be regarded as two independent universal joints combined so that one member, namely, the intermediate ring is a part of each joint.

The machine is adjustable also as to the amount of reduction through the combination of the vertical pantograph with the horizontal pantograph. As shown the horizontal pantograph may be altered to reduce from two to one with the pin 99 as shown in Fig. 1, or four to one with the pin placed at the point 109. The vertical pantograph may in practice have a reduction, for example, of twelve to one. This combination ability of the machine makes it possible to use large patterns while obtaining a reproduction which is very small, and this makes for accuracy of reproduction; it also makes possible the construction of a machine having the variable adjustment advantages of a vertical pantograph together with a large degree of reduction, which in the machine shown may be, as indicated, forty-eight to one, without requiring a high, massive machine with the tool and work so located as to be beyond the reach of an operator handling the tracer; a vertical machine having this amount of reduction would be wholly impractical. The tracer 103 usually operates upon the vertical edge of a raised pattern and because it is a part of a flat or horizontal lever mechanism, it follows the pattern edges without producing any distortion, such as occurs in the case of a vertical pantograph having a tracer such as the tracer 13 which swings back and forth over the base plate at various angles thereto varying from the perpendicular. Such a swinging tracer when used to follow the pattern is only vertical when working directly below the axis of the universal joint, and presents an incline to the vertical when moved to one side so that it engages at certain parts of the pattern with the upper line of its edge and at other parts of the pattern with the bottom line of its edge. This produces a distortion in the product which particularly in typographical and similar extremely accurate reproductions is objectionable because even distortions which are so slight as not capable of being measured, may destroy the artistic effect desired by the designer. The use of the combination of pantographs, thus providing a stylus or tracer which is at all times perpendicular to the plane of the pattern, causes the tracer to act at all times against the full, perpendicular edge of the pattern and produces a product which has no distortion.

I claim:

1. A punch cutting machine comprising a tracer lever suspended to swing in all directions whereby its tracer may follow a pattern; a slidable member; adjustable means connecting the lever and member whereby movement of the lever in one direction will drive the member in said direction; a second slidable member, adjustable means connecting the lever and said second member whereby movement of the lever in a direction at right angles to said first named direction will drive the second member in said right angle direction; a holding device connected with said members to be driven thereby whereby the motion of said device will correspond to the motion of said tracer, the proportional degree of motion of the device in either of the two said directions being dependent upon the particular adjustment of said two connecting means.

2. A punch cutting machine comprising a tracer lever suspended to swing in all directions whereby its tracer may follow a pattern; a slidable member, an adjustable lever system connecting said tracer lever and said slidable member whereby the movement of the lever in one direction will drive the member in said direction, a second slidable member, a second adjustable lever system connecting the lever and said second member whereby movement of the lever in a direction at right angles to said first named direction will drive the second member in said right angle direction, and a holding device mounted to be driven by each of said members.

3. A punch cutting machine comprising a tracer lever suspended to swing in all directions whereby its tracer may follow a pattern, a slidable plate, adjustable means connecting the lever and plate whereby movement of the lever in one direction will drive the plate in said direction, a second plate, adjustable means connecting the lever and said second plate whereby movement of the lever at right angles to said first named direction will drive the second plate in said right angle direction, a key between said plates whereby said second plate may be driven by the lever without affecting the movement of the first plate but whereby the movement of the first plate will carry said second plate along with it, said connecting means between the lever and the second plate being provided with a pivot whereby this movement of the second plate when driven by the first plate is permitted, and a holding device detachably secured to said second plate.

4. A punch cutting machine comprising a tracer lever suspended from a gimbal joint whereby its tracer may swing in all directions to follow a pattern, said gimbal joint comprising an outer ring pivoted to a frame and an inner ring to which the lever is fixed, said inner ring being pivoted to the outer ring at right angles to the pivots of the latter, a slidable member, an arm adjustable in length connecting the outer gimbal ring with said member to drive the latter in one direction, a second slidable member, a second arm adjustable in length pivotally supported within the inner ring of the gimbal on pivots extending in the same direction as the pivots of the outer gimbal ring, said arm connecting the inner gimbal ring with said second slidable member to drive it in a direction at right angles to the direction in which said first slidable member is driven, and a holding device mounted to be driven by each of said members.

5. A punch cutting machine comprising a tracer lever suspended from a universal joint having non-adjustable pivots at right angles to each other so that the lever may swing in any direction, a holding plate movable in a horizontal plane, an arm connecting the universal joint with said plate, said arm being adjustable in length and being connected with the universal joint to swing on one of the pivots thereof to drive the plate when the tracer lever is moved to swing on said pivots, a second plate movable in a horizontal plane at right angles to the movement of said first plate, and a second arm connecting said second plate with the said universal joint and swinging on the pivots thereof at right angles to the aforementioned pivots, said second arm being adjustable in length independently of the adjustment of the first arm and said first arm being pivoted to the universal joint to follow freely the movements of the second plate.

6. A reproducing machine comprising a three ring gimbal joint, a tracer arm connected with the intermediate ring, an element to be driven in accordance with the movements of the tracer arm, a connection between the outer gimbal ring and the said element to drive it in one direction and a connection between the inner gimbal ring and the element to drive it in a direction at right angles to the first named direction.

7. A punch cutting machine comprising a three ring gimbal joint, a tracer arm connected with the intermediate ring, a work holding plate, independently adjustable driving connections between the other rings and the plate whereby driving the plate in one direction is controlled by one adjustable connection and driving it in a direction at right angles thereto is controlled by the other adjustable connection, and a cutting tool located in a fixed position to operate upon the work.

8. A punch cutting machine comprising a tracer lever suspended from a non-adjustable universal joint to swing in all directions to follow a pattern, a slidable plate, means including a telescopically adjustable arm connecting the lever and plate whereby the lever when moved in one direction will drive the plate in said direction, a second slidable plate, means including a telescopically adjustable arm connecting the lever and said second plate whereby the lever when moved in a direction at right angles to said first named direction will drive the second plate in said right angle direction, a holding device operatively connected with said plates to be driven thereby whereby the motion of the said device will correspond with the motion of said tracer, the proportional degree of motion of the device in either of the two directions depending upon the adjustment of said two connecting means.

9. A reproducing machine comprising an element to be moved in two directions at right angles to each other, a universal joint comprising a power receiving member and two driving members, a tracer arm connected with said power receiving member, a connection between the element and one of said driving members whereby the latter drives the element in one direction, a second connection between the element and the other of said driving members whereby the latter drives the element in a direction at right angles to said first named direction, each of said connections being adjustable in effective length independently of the other.

10. A punch cutting machine comprising a work holding member mounted to move in all directions in a horizontal plane, a driving member, a key between the two members whereby the driving member drives the work holding member in one direction and allows it to move freely in a direction at right angles thereto, a tracer arm suspended to swing in all directions to follow a pattern, a connection, adjustable in length, between the tracer arm and the work-holding member and a second connection, adjustable in length between the tracer arm and the driving member, whereby movement of the tracer arm in one direction will move the driving member through the connection therebetween and with it through the key will also move the work-holding member and whereby movement of the tracer arm in a direction at right angles to said first named direction will move the work-holding member in said right angle direction through the said connection between the tracer arm and the work-holding member.

11. A punch cutting machine comprising a base plate, a universal joint, a tracer arm suspended from the joint to swing in all directions above the base plate, a work holder, a cutting tool to operate upon the work in the holder, a connection between the universal joint and the work holder to cause movement of the work holder in accordance with the movements of the tracer arm, a pantograph pivoted to the base plate and located at all times in a plane parallel with the plane of movement of the work holder, a pattern tracer secured to the pantograph and extending at all times parallel to the axis of the cutting tool, and a universal joint connection between the said tracer arm and the said pantograph.

12. A punch cutting machine comprising a base plate, a three ring gimbal joint, a tracer arm suspended from the intermediate gimbal ring to swing in all directions over the base plate, a work holder, a connection between the outer gimbal ring and the work holder, a second connection between the inner gimbal ring and the work holder, said connections causing movement of the work holder in accordance with the movements of the tracer arm, a cutting tool to operate upon the work in the work holder and extending perpendicular to the plane of movement thereof, a pantograph pivoted to the base plate and located at all times in a plane parallel with the plane of movement of said work holder, a universal joint connection between the pantograph and the tracer arm and a tracer for the pantograph extending at all times parallel to the axis of the cutting tool.

MAURITZ C. INDAHL.